US012769566B2

(12) United States Patent
Shmueli Friedland et al.

(10) Patent No.: US 12,769,566 B2
(45) Date of Patent: Oct. 20, 2026

(54) CHARACTERIZING NOTIFICATION DISTINCTIVENESS FOR A FINITE-STATE MACHINE MODELED SYSTEM

(71) Applicant: GM GLOBAL TECHNOLOGY OPERATIONS LLC, Detroit, MI (US)

(72) Inventors: Yael Shmueli Friedland, Tel Aviv (IL); Daniel Y. Rubin, Holon (IL); Asaf Degani, Tel Aviv (IL); Shani Avnet, Tel Aviv (IL); Lisa M. Talarico, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 786 days.

(21) Appl. No.: 18/322,165

(22) Filed: May 23, 2023

(65) Prior Publication Data

US 2024/0394070 A1 Nov. 28, 2024

(51) Int. Cl.
*G06F 9/448* (2018.01)

(52) U.S. Cl.
CPC .................................. *G06F 9/4498* (2018.02)

(58) Field of Classification Search
CPC .................................................... G06F 9/4498
See application file for complete search history.

(56) References Cited

U.S. PATENT DOCUMENTS 6,853,963 B1 2/2005 Apfelbaum et al.
9,538,225 B2 * 1/2017 Bonvolanta ........ H04N 21/4884
9,919,647 B2 * 3/2018 Chen ..................... B60W 50/14
10,976,820 B2 * 4/2021 Ganadas ................. G06F 3/016
11,340,750 B1 * 5/2022 Willis ...................... G06F 3/048
2013/0342330 A1 * 12/2013 Kiefer ....................... G08B 6/00 340/407.1
2016/0232624 A1 * 8/2016 Goldberg ............... G06Q 30/08
2016/0344762 A1 * 11/2016 Jou ........................ G06F 21/577
2019/0266665 A1 * 8/2019 Wang ................ G06Q 30/0645
2022/0318625 A1 * 10/2022 O'Toole ................... G06N 3/08

FOREIGN PATENT DOCUMENTS

CA 2949426 C * 1/2024 ............. B64D 45/00
WO WO-2019112516 A1 * 6/2019 ............ B25J 13/084

OTHER PUBLICATIONS

Itemis, "The SC Simulation Perspective", published on Feb. 4, 23 at https://www.itemis.com/en/products/itemis-create/documentation/userguide/simu_simulating_statecharts, retrieved Apr. 13, 26. (Year: 2023).*

(Continued)

*Primary Examiner* — Shourjo Dasgupta
(74) *Attorney, Agent, or Firm* — Quinn IP Law

(57) ABSTRACT

Characterizing notification distinctiveness for a finite-system machine (FSM) modeled system based on distinctiveness ratings generated for state transitions of the FSM-modeled system. The distinctiveness ratings may be operable for comparatively quantifying relative distinctiveness for notifications used to provide feedback for state transitions. The distinctiveness ratings may be generated to comparatively quantify relative distinctiveness between notifications of a transitioned-from and a transitioned-to state of the state transition associated therewith.

20 Claims, 4 Drawing Sheets

(56) References Cited

OTHER PUBLICATIONS

Itemis, “What is itemis Create?” published on Feb. 4, 23 at https://www.itemis.com/en/products/itemis-create/documentation/user-guide/overview_what_are_itemis_create_statechart_tools?, retrieved Apr. 13, 2026. (Year: 2023).*
Sogeti, “TMAP—State Transition Testing”, published on Feb. 1, 2022 at https://www.tmap.net/wiki/state-transition-testing, retrieved Apr. 13, 2026 . (Year: 2022).*
Esri, “Graduated Colors”, published on Jan. 22, 2023 at https://pro.arcgis.com/en/pro-app/latest/help/mapping/layer-properties/graduated-colors.htm, retrieved Apr. 13, 2026. (Year: 2023).*
Tom Mens, “Sismic: An open source Python API for statechart execution, validation and testing”, published on Aug. 13, 2018 to https://modeling-languages.com/sismic-python-api-statechart-execution, retrieved Apr. 13, 2026. (Year: 2018).*
Andrew Hooker, “Improving the State Machine of Your Business”, published on Nov. 15, 2018 to https://www.headway.io/blog/improving-the-state-machine-of-your-business, retrieved Apr. 13, 2026. (Year: 2018).*
Joonas Tiala, “Utilizing state machines in front-end development”, published on Sep. 14, 2022 to https://dev.solita.fi/2022/09/14/utilizing-state-machines-in-front-end-development.html, retrieved Apr. 13, 2026. (Year: 2022).*
Visual Paradigm, “Introduction to State Diagrams: A Comprehensive Guide for Software Engineering”, published on Mar. 22, 2023 to https://guides.visual-paradigm.com/introduction-to-state-diagrams-a-comprehensive-guide-for-software-engineering, retrieved Apr. 13, 2026. (Year: 2023).*
David Harel; Statecharts: A Visual Formalism for Complex Systems; Science of Computer Programming 8 (1987) ; Department of Applied Mathematics, The Weizmann Institute of Science, Rehovot, Israel; pp. 231-274.

* cited by examiner

60

62 63 64

| Evt | State | A | B | C | • • • | ZZ |
|---|---|---|---|---|---|---|
| E1 | A | A | C | B | • • • | D |
| E2 | E | E | A | A | • • • | G |
| E3 | Manual | M | M | M | • • • | M |
| • • • | | | | | | |
| EN | A | A | A | . | • • • | A |

FIG. 2

226 224 226 228 230 232 224 234 222 216

| State | Notification | | | | | |
|---|---|---|---|---|---|---|
| | Indicator #1 | Indicator #2 | Indicator #3 | Indicator #4 | Indicator #5 | Indicator #6 |
| { 'A' } | { 'none' } | { 'no' } | { 'd' } | { '1' } | { 'd/e/a' } | { 'off' } |
| { 'B' } | { 'a' } | { 'no' } | { 'a' } | { '2' } | { 'a' } | { 'off' } |
| { 'C' } | { 'a' } | { 'yes' } | { 'a' } | { '2' } | { 'a' } | { 'off' } |
| { 'A' } | { 'a' } | { 'no' } | { 'a' } | { '2' } | { 'e' } | { 'off' } |
| { 'B' } | { 'a' } | { 'yes' } | { 'a' } | { '2' } | { 'e' } | { 'off' } |
| { 'C' } | { 'none' } | { 'no' } | { 'd' } | { '2' } | { 'none' } | { 'off' } |
| { 'A' } | { 'b' } | { 'no' } | { 'b' } | { '2' } | { 'none' } | { 'off' } |
| { 'B' } | { 'none' } | { 'no' } | { 'd' } | { '2' } | { 'none' } | { 'off' } |
| { 'C' } | { 'c' } | { 'no' } | { 'c' } | { '2' } | { 'none' } | { 'off' } |
| { 'A' } | { 'c' } | { 'no' } | { 'c' } | { '2' } | { 'none' } | { 'off' } |
| { 'B' } | { 'c' } | { 'no' } | { 'c' } | { '2' } | { 'none' } | { 'off' } |
| { 'C' } | { 'none' } | { 'no' } | { 'd' } | { '2' } | { 'none' } | { 'off' } |
| { 'L' } | { 'none' } | { 'no' } | { 'none' } | { '1' } | { 'none/e/a/d' } | { 'off' } |

FIG. 3

CHARACTERIZING NOTIFICATION DISTINCTIVENESS FOR A FINITE-STATE MACHINE MODELED SYSTEM

INTRODUCTION

The present disclosure relates to characterizing notification distinctiveness for modeled systems, such as but not necessarily limited to characterizing distinctiveness of notifications utilized to differentiate transitions between states of a finite-state machine (FSM) modeled system.

A finite-state machine (FSM) may be utilized to facilitate designing and validating expected behavior of a modeled system. A FSM, for example, may be used in representing a myriad of different software programs, physical systems, states, models, and other constructs forming the modeled system. The FSM may be graphically represented in the form of a state diagram having an initial state, one or more additional states, associated state transitions between states, and various inputs and/or events. The model may also be given in other forms such as a state transition table. Based on the present state of the modeled system and a given event or event combination, the corresponding FSM may delineate one or more state transitions between differing states. When modeled systems include some level of interaction with a user or other entity, it may be desirable or required for the system to provide a reasonably perceptible, noticeable, visible, and/or cognitively clear notification as feedback when completing one or more of the state transitions.

SUMMARY

One non-limiting aspect of the present disclosure relates to a distinctiveness tool configured for characterizing notification distinctiveness for finite-state machine (FSM) modeled systems. The distinctiveness tool may employ FSM techniques to delineate and measure distinctiveness of notifications used to provide feedback for state transitions. The distinctiveness tool may be configured for generating distinctiveness ratings for the state transitions based on a relative distinctiveness difference between the notifications of the states associated therewith, e.g., based on notification variations between a transitioned-from state and a transitioned-to state. The distinctiveness ratings may be used to quantify differences between the notifications as a function of size, saliency, etc. between a collection of indicators associated therewith. The collection of indicators, for example, may include one or more visual, auditory, and/or haptic attributes such that those attributes may be compared to generate the distinctiveness ratings. The capability to quantify distinctiveness of the notifications in this manner may be beneficial in providing an FSM-based analysis of whether the modeled system provides reasonably perceptible, noticeable, visible, and/or cognitively clear notifications as feedback to a user, a machine, or other entity when completing one or more of the state transitions, i.e., when transitioning between states.

One non-limiting aspect of the present disclosure relates to a method for characterizing notification distinctiveness of a finite-state machine (FSM) modeled system. The method may include identifying a plurality of states for the FSM modeled system and identifying a notification to be presented for each of the states. The notifications may each present one or more indicators selected from a collection of indicators, optionally with the collection of indicators including at least one visual, auditory, and haptic attribute. The method may further include identifying a plurality of state transitions between the states, optionally with the state transitions each defining an event for transitioning from a transitioned-from one of the states to another transitioned-to one of the states. The method may still further include generating a distinctiveness rating for each of the state transitions, optionally with the distinctiveness ratings each comparatively quantifying relative distinctiveness between the notifications for the transitioned-from and transitioned-to states of the state transition associated therewith.

The method may include generating the distinctiveness ratings based at least in part on the attributes for the notifications of the transitioned-from and transitioned-to states associated therewith.

The method may include assigning a value to each of the attributes and generating the distinctiveness ratings as a function of the values for the notifications of the transitioned-from and transitioned-to states associated therewith.

The method may include generating the distinctiveness ratings to be proportional to a delta difference between the values of the notifications for the transitioned-from and transitioned-to states associated therewith.

The method may include a number as part of each of the distinctiveness ratings, the number representing a magnitude of the delta difference for the distinctiveness rating associated therewith.

The method may include a color coding as part of each of the distinctiveness ratings, where magnitude of the delta difference for the distinctiveness rating associated therewith are represented by colors.

The method may include presenting the distinctiveness ratings within a distinctiveness abstraction table. The distinctiveness abstraction table may be configured for cross-referencing a plurality of cells relative to a plurality of columns and rows, with each column and row being associated with one of the states and each of the cells representing the state transition of the cell and the row cross-referenced therewith.

The method may include determining each of the state transitions to be one of feasible and infeasible and including a feasibility callout for each of the distinctiveness ratings of the state transitions deemed to be feasible and omitting the feasibility callout for each of the distinctiveness ratings of the state transitions deemed to be infeasible.

One non-limiting aspect of the present disclosure relates to a method for characterizing notification distinctiveness of a finite-state machine (FSM) modeled system The method may include, based on a state transition table (or any other form of FSM model) configured for defining a plurality of state transitions between a plurality of states of the FSM modeled system, identifying an event for transitioning from a transitioned-from one of the states to another transitioned-to one of the states and a transitioned-to notification to be presented upon attainment of each of the transitioned-to states. The method may further include generating a distinctiveness rating for each of the transitioned-to notifications, optionally with the distinctiveness ratings each quantifying distinctiveness of the transitioned-to notification for the transitioned-to state associated therewith.

The method may include generating the distinctiveness ratings to quantify the distinctiveness of the transitioned-to notification relative to a transitioned-from notification of the transitioned-from state of the state transition associated therewith.

The method may include the transitioned-to and transitioned-from notifications each presenting one or more indicators selected from a collection of indicators, the collection of indicators including at least one visual, auditory, and haptic attribute. The method may further include generating the distinctiveness ratings based at least in part on differences between the attributes for the transitioned-to and transitioned-from notifications associated therewith.

The method may include assigning a value to each of the attributes and generating the distinctiveness ratings as a function of differences between the values for the transitioned-to and transitioned-from notifications associated therewith.

The method may include generating the distinctiveness ratings to be proportional to a delta difference between the values for the transitioned-to and transitioned-from notifications associated therewith.

The method may include a value as part of each of the distinctiveness ratings, optionally with the value representing a magnitude of the delta difference for the distinctiveness rating associated therewith.

The method may include a color coding as part of each of the distinctiveness ratings, optionally with the color coding representing a magnitude of the delta difference for the distinctiveness rating associated therewith.

The method may include presenting the distinctiveness ratings within a distinctiveness abstraction table. The distinctiveness abstraction table may be configured for cross-referencing a plurality of cells relative to a plurality of columns and rows, with each column and row being associated with one of the states and each of the cells representing the state transition of the cell and the row cross-referenced therewith.

The method may include determining each of the state transitions to be one of feasible and infeasible and including a feasibility callout for each of the distinctiveness ratings of the state transitions deemed to be feasible and omitting the feasibility callout for each of the distinctiveness ratings of the state transitions deemed to be infeasible.

One non-limiting aspect of the present disclosure relates to a system for characterizing notification distinctiveness of a FSM modeled system. The system may include a tabulating module configured for determining a state distinctiveness abstraction table for the finite-state machine. The distinctiveness abstraction table defining a plurality of state transitions between a plurality of states, optionally with each state transition defining an event for transitioning from a transitioned-from one of the states to another transitioned-to one of the states. The system may further include a distinctiveness tool configured for determining a notification to be presented for each of the states and generating a distinctiveness rating for each of the state transitions, optionally with the distinctiveness ratings each comparatively quantifying relative distinctiveness between the notifications for the transitioned-from and transitioned-to states of the state transition associated therewith.

The distinctiveness tool may be configured for determining one or more attributes for each of the notifications and generating the distinctiveness ratings based at least in part on differences between the attributes for the notifications of the transitioned-from and transitioned-to states associated therewith.

The distinctiveness tool may be configured presenting the distinctiveness ratings within a distinctiveness abstraction table, the distinctiveness abstraction table cross-referencing a plurality of cells relative to a plurality of columns and rows, each column and row being associated with one of the states, each of the cells representing the state transition of the cell and the row cross-referenced therewith.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 2 illustrates a state transition table in accordance with one non-limiting aspect of the present disclosure.

FIG. 3 illustrates a feedback table in accordance with one non-limiting aspect of the present disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
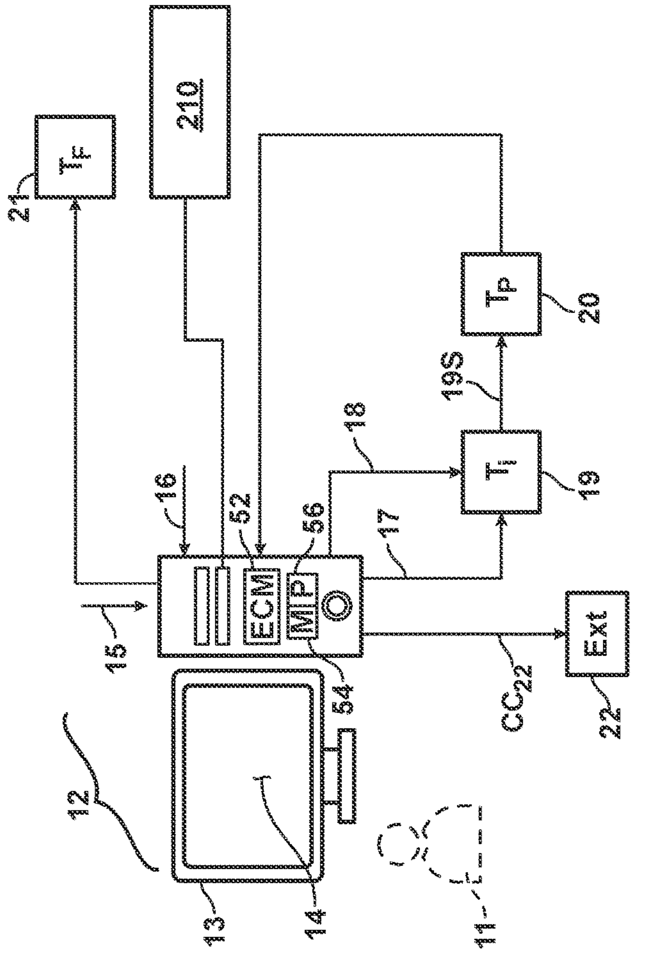
FIG. 1 illustrates a computerized modeling system in accordance with one non-limiting aspect of the present disclosure.

FIG. 1 illustrates a computerized modeling system 10 in accordance with one non-limiting aspect of the present disclosure. The computerized modeling system 10 is shown for exemplary purposes with respect to performing data entry, automatic error-checking, notification verifications, and other operations during the design of a FSM. The modeling system 10 may include a host computer 12, e.g., a laptop computer, tablet computer, desktop computer, mobile application ("app"), etc., that may be configured for assisting a designer, programmer, or another user 11 when modeling a complex hardware and/or software-based system ("FSM-modeled system"). Although the host computer 12 may be depicted as a single device for illustrative simplicity, those skilled in the art will appreciate that the host computer 12 could be implemented as a distributed host computer system 120 having multiple processing nodes, e.g., 12A, 12B, . . . , 12N, as depicted schematically in FIG. 1A. Such processing nodes may be in communication with one another over a suitable wired or wireless networked connection. The modeling system 10 may be used to model performance of a human-machine interface ("HMI") or another device aboard a motor vehicle or an aircraft, watercraft, rail vehicle, or another dynamic system, or to model performance of a medical device, powerplant, or another static system.

The modeling system 10 of FIG. 1 may include one or more peripheral devices 13, including a display screen 14 operable as an output device for the host computer 12. The user 11 may interact with the host computer 12 via one or more additional peripheral devices 13 (not shown), e.g., a mouse, keyboard, touch inputs to the display screen 14, etc., when developing or designing the FSM-modeled system, including functions of resident software and/or hardware thereof. As appreciated in the art, the task faced by the user 11 when designing an application-suitable FSM model may be often complicated by the sheer complexity of the FSM-modeled system. For example, while operation of a binary system such as an on/off table lamp could be represented by its two possible states ("on" and "off"), two possible state transitions ("on-to-off" and "off-to-on"), and two inputs or events ("switch turned off" and "switch turned on"), the accurate FSM modeling of more complex systems could require the same user 11 to consider hundreds or thousands of different states, state transitions, events, and other possible system traits. It is thus possible that the user 11 could inadvertently overlook or omit one or more states, state transitions, or event combinations ("super-events"), which in turn could degrade the performance and quality of the modeled system.

Figure 1A:
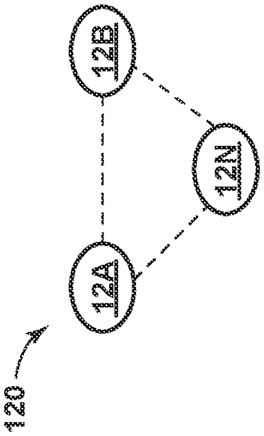
FIG. 1A illustrates an exemplary embodiment of distributed processing nodes in accordance with one non-limiting aspect of the present disclosure.

As part of the present strategy, the host computer 12 of FIG. 1 or its constituent processing nodes 12A, 12B, . . . , 12N of FIG. 1A may be equipped with an error-checking module ("ECM") 52, non-tangible computer-readable storage medium or memory (M) 54, and one or more processors (P) 53, e.g., logic circuits, combinational logic circuit(s), Application Specific Integrated Circuit(s) (ASIC), electronic circuit(s), central processing unit(s), semiconductor IC devices, etc., as well as input/output (I/O) circuit(s), appropriate signal conditioning and buffer circuitry, and other components such as a high-speed clock to provide the described functionality. The associated memory 54 may include application-suitable amounts and types of non-transitory memory inclusive of read only, programmable read only, random access, a hard drive, etc., whether resident, remote or a combination of both. The host computer 12 may be configured to receive system traits 15 from the user 11. This could entail receiving various states, state transitions, and events of the modeled system, along with a possible super-events (event combinations), a hierarchy definition, and other system traits 15. In response to the received system traits 15, the host computer 12 automatically generates and outputs a first data set 17 embodying a blank/unpopulated initial state transition table (Ti) 19. This initial state transition table 19 is indexed by as complete of a population of possible states and events of the modeled system as possible, and with the system traits 15 entered by the user 11. Additionally, the host computer 12 automatically populates the initial state transition table 19 with a second data set 18 to thereby generate a third data set 19S, the third data set 19S including a populated state transition table ("$T_P$") 20.

The host computer 12 may automatically generate ("auto-generates") the populated state transition table 20 as the third data set 19S. This occurs in response to a set of user inputs 16. After performing one or more iterations of a method 100, an example of which is described below with reference to FIG. 9, the host computer 12 ultimately outputs a final state transition table ($T_F$) 21. The final state transition table 21 is then used as needed, typically as a starting point for further investigation by the user 11 and to serve as a basis for developing a state diagram and scenario simulations for the modeled system. As part of the disclosed solutions, the host computer 12 shown schematically in FIG. 1 processes the third data set 19S through the ECM 52 to error-check the populated state transition table 20. This action occurs using predetermined error-checking criteria. For instance, the host computer 12 could search the populated state transition table 20 for omitted critical traits, e.g., an omitted state, state transition, event, and/or other trait(s) of a system-critical or function-critical component of the modeled system. The host computer 12 may also communicate an alert signal ($CC_{22}$) to the display screen 14 or to an external device ("Ext Device") 22 such as a smart phone or one of the various processing nodes 12A, 12B, . . . , 12N of FIG. 1A as part of the present strategy as noted below, with such an action occurring in response to the omitted critical trait.

FIG. 2 illustrates a state transition table 60 in accordance with one non-limiting aspect of the present disclosure. The various state transition tables 19, 20, and 21 shown schematically in FIG. 1 may be visualized as a simplified state transition table 60. In this exemplary illustration, the state transition table 60 is organized into a row of nominal states 64, e.g., A, B, C, . . . , ZZ for simplicity, and an "event" column 62 containing nominal events E1, E2, E3, . . . , EN. Each event in column 62 in turn could trigger a transition to a corresponding state in column 63. For instance, event E2 occurring in state A could cause the modeled system to transition to state E in the illustrated state transition table 60. As part of the present approach, each of the states defined by the user 11 are listed in the exemplary state transition table 60. The user 11 may be able to access the state transition table 60 and edit it directly, for example in response to a prompt from the host computer 12 of FIG. 1 indicating an omitted critical state, state transition, or event. That is, the host computer 12 may allow the user 11 to edit the state transition table 60 from within, e.g., by opening a drop-down menu in response to the user 11 selecting a particular state or event from the state transition table 60. This functionality may be illustrated for simplicity at nominal event E3, via its boxed outline, and the notation "Manual" or "M" indicating the possibility of the user 11 editing or entering corresponding states into the state transition table 60. The user 11 may thus be guided when constructing, populating, error-checking, and updating the state transition table 60.

One-limiting aspect of the present disclosure relates to the modeling system 10 including a distinctiveness tool 210. The distinctiveness tool 210 may be configured for characterizing notification 216 distinctiveness of an FSM-modeled system. The distinctiveness tool 210 may employ FSM techniques to delineate and measure distinctiveness of feedback provided for the state transitions. FIG. 3 illustrates a feedback table 214 in accordance with one non-limiting aspect of the present disclosure. The feedback table 214 illustrates a plurality of notifications 216 configured for providing feedback for current states and state transitions. The notifications 216 may be intended to provide reasonably perceptible, noticeable, visible, and/or cognitively clear cognitively clear notifications 216 as feedback to a user, a machine, or other entity. This may be beneficial when completing one or more of the state transitions, i.e., when transitioning between states. The notifications 216 are shown for exemplary purposes to correspond with a collection of indicators 222 useful for providing feedback. A notification column 224 may include a plurality of rows, with each row representing a notification 216 to be presented while the modeled system is at the corresponding one of the states listed in a state column 226. The notifications 216, or more specifically the information, content, etc. of each notification 216, may be selected from a collection of indicators 222. The collection of indicators 222 may include one or more visual, auditory, haptic, and/or other type of attributes.

The indicators 222 may themselves be further definable to include one or more of a plurality of selectable attributes, however, there may be a different number of indicators 22 depending on the modeled system. The attributes may be individually selected to define granular parameters for the collection of indicators 222 to be included within the corresponding notification 216. The feedback table 214 is shown for non-limiting purposes with respect to the notifications 216 being generated according to a first indicator 224, a second indicator 226, a third indicator 228, a fourth indicator 230, a fifth indicator 232, and a sixth indicator 234, with each of the indicators 224, 226, 228, 230, 232, 234 including variables for one or more of a plurality of selectable attributes (not individually labeled). Further indicators 222 may be included, included indicators for sound and haptics. The selectable attributes for the first indicator 224 may be selected from a first listing of available attributes, which are shown to correspond with a listing of light color outputs, such as no color (none), color a, color b, color c, etc. The selectable attributes for the second indicator 226 may be selected from a second listing of available attributes, which are shown to correspond with defining a blinking feedback, such as no blinking (no) and blinking (yes) and/or a blinking pattern—a function of the pulsation frequency, envelope shape, and the inter-stimulus duration of the pulsations, which may also be adapted to the urgency of the message or state. The selectable attributes for the third indicator 228 may be selected from a third listing of available attributes, which are shown to correspond with an icon color output, such as no color (none) and colors a, b, c, d. The selectable attributes for the fourth indicator 230 may be selected from a fourth listing of available attributes, which are shown to correspond with defining an icon position, such as a primary position (1) and a secondary position (2). The selectable attributes for the fifth indicator 232 may be selected from a fifth listing of available attributes, which are shown to correspond with a color display sequence, such as no color (none) and/or combinations of colors a, b, c, d, and e. The selectable attributes for the sixth indicator 234 may be selected from a sixth listing of available attributes, which are shown to correspond with a flasher setting display sequence, such as no flashing (off) and flashing (on) and/or other configuration capable of rendering a generic identity.

The notifications 216, or more specifically the indicators 222 and/or attributes associated therewith, are merely illustrative of a vast variety of variables that may be utilized for the notifications 216. This is done for exemplary and non-limiting purposes as the present disclosure fully contemplates other types of notifications 216 being utilized, including notifications 216 that may be interfaced with other systems, machines, computers, entities, etc., optionally without user interaction. The present disclosure also contemplates the notifications 216 being employed with other types of modeled systems besides motor vehicles, such as the above-noted aircraft, watercraft, rail vehicle, dynamic or static system, medical device, powerplant, etc. The notifications 216 presented in FIG. 3 are merely exemplary of diverse notifications 216 that may be generated according to an extensive collection of indicators 222, attributes, and variables. The notifications 216 may be correspondingly generated depending on the activities of the modeled system such that the present disclosure fully contemplates the indicators 222 including a widespread combination of visual, auditory, haptic, or other types of attributes, including those that may be considered as machine or computer attributes, at least in so far as being intended for interfacing with a machine as opposed to an individual, e.g., to provide data, information, metrics, etc. as feedback to another system. Non-verbal auditory content may be distinguishable on the basis of the selected timbre, pulse duration, pulse rate, frequency, loudness, etc. Haptic content may be distinguishable on the basis of the pulse pattern, inter-pulse-interval, pulse duration, pulse repetition rate or number of pulses, vibration intensity, etc.

Figure 4:
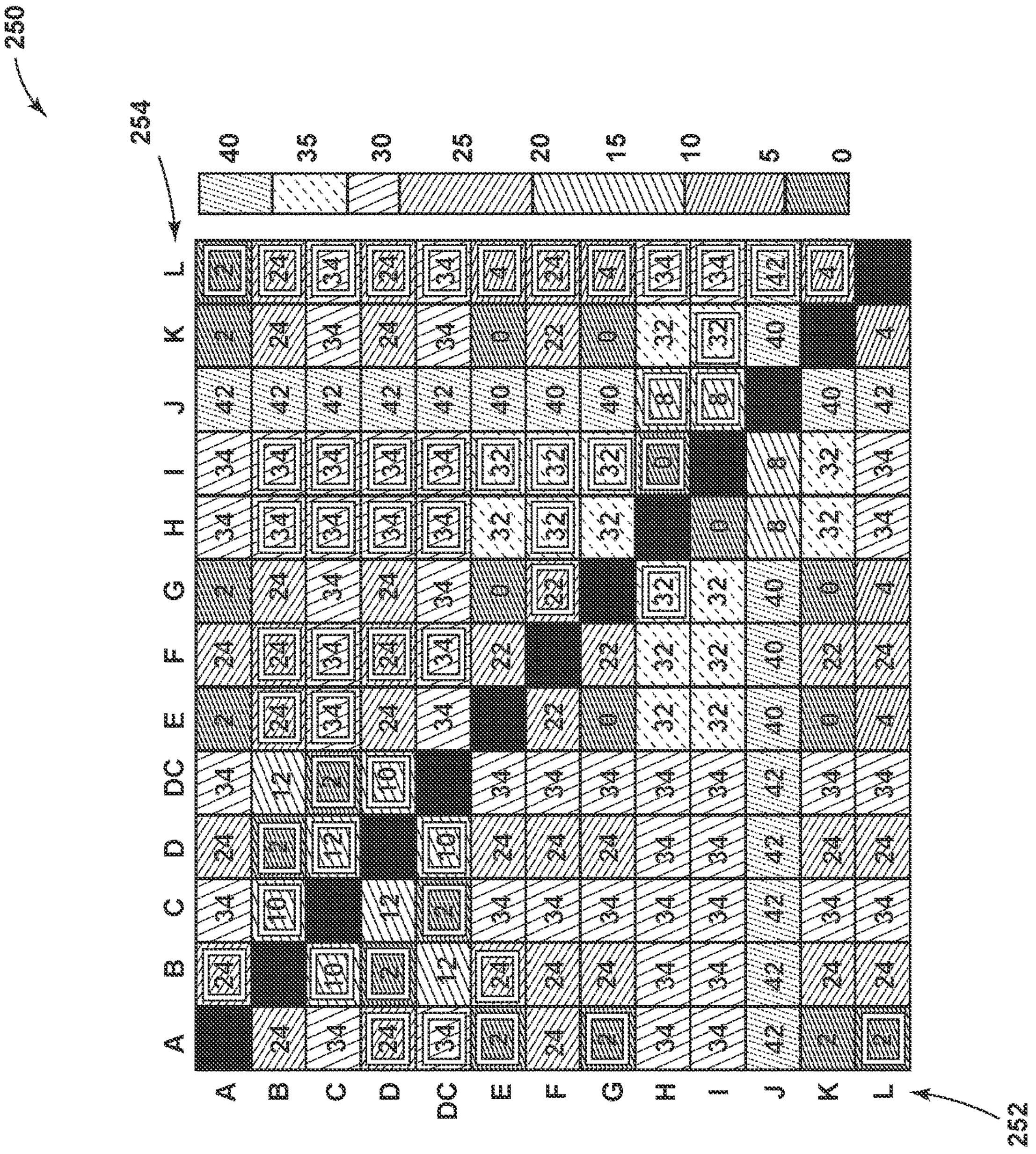
FIG. 4 illustrates a distinctiveness abstraction table in accordance with one non-limiting aspect of the present disclosure.

The distinctiveness tool 210 may be configured to utilize the properties of each notification 216 to facilitate generating a distinctiveness rating for the corresponding notification 216. The distinctiveness tool 210, in other words, may be configured to generate distinctiveness ratings for each of the notifications 216 based on the indicators 222 and attributes associated therewith. One non-limiting aspect of the present disclosure contemplates generating the distinctiveness ratings for each of the state transitions. The distinctiveness ratings may be used in this manner to comparatively quantify relative distinctiveness between the notifications 216 for each state transition based on differences between a transitions-from state and a transitioned-to state associated therewith. FIG. 4 illustrates a distinctiveness abstraction table 250 in accordance with one non-limiting aspect of the present disclosure. The distinctiveness abstraction table 250 may be configured for visually displaying distinctiveness ratings generated for each of the state transitions. The state transitions may correspond with activities, events, etc. associated with transitioning from one state to another state, i.e., from a transitioned-from state to a transitioned-to state. The distinctiveness abstraction table 250 may include cross-referencing a plurality of cells relative to a transitioned-from one of the states and a transitioned-to one of the states, which are shown for non-limiting purposes to correspond with the transitioned-from states being listed along a vertical axis 252 and the transitioned-to states being listed along a horizontal axis 254.

The distinctiveness abstraction table 250 may be used in this manner to delineate each of the state transitions according to FSM principles. The distinctiveness rating included within each of the cells may be utilized to represent distinctiveness of the notification 216 associated with the related state transition. The distinctiveness ratings may be used in this manner to quantify relative distinctiveness between the notifications 216 for the transitioned-from and transitioned-to states associated therewith. The distinctiveness ratings may be used to represent or otherwise normalize a degree by which the notification 216 at a start of a state transition differs from a notification 216 at an end of the corresponding state transitions. The distinctiveness rating, in other words, may be configured to represent or normalize a degree by which a transitioned-from notification differs from a transitioned-to notification. The capability to provide a distinctiveness rating for each of the state transitions may be beneficial in assisting a designer, a software program, etc. in ascertaining information beneficial in comparing whether the modeled system provides reasonably perceptible, noticeable, visible, and/or cognitively clear notifications 216 as feedback to a user, a machine, or other entity upon completing one or more of the state transitions. The distinctiveness ratings may be used to quantify differences between the notifications 216 according to size, saliency, etc. of the indicators 222 and attributes associated therewith.

One non-limiting aspect of the present disclosure contemplates including one or more values, metrics, or other factors as part of the distinctiveness ratings. The distinctiveness ratings, as such, may be presented in various forms, optionally including a combination of alphanumeric text, indicia, icons, callouts, color coding, and the like. FIG. 4 illustrates the distinctiveness ratings being configured for non-limiting purposes to each include a value, a color coding, and a feasibility callout. The values may be derived from assigning a value to each of the attributes and generating the distinctiveness ratings as a function of differences between the values for the transitioned-to and transitioned-from notifications associated therewith. The distinctiveness ratings may be calculated to be proportional to a delta difference between the values for the transitioned-to and transitioned-from notifications associated therewith.

The values included as part of the distinctiveness ratings may be generated as a difference between a summation of the weighted values assigned to each of the attributes 222 of each notification 216. The following equation may be used to calculate the value as a number:

$$N = w\_1 * |f\_1 - t\_1| + w\_2 * |f\_2 - t\_2| + \dots \quad \text{(eq. 1)}$$

where w_1, w_2, etc. are weights, f_i is the value assigned to a single indicator at "from" state, and t_i is the value assigned to a single indicator at "to" state.

The following equation may also be used:

$$N = w\_1 * c\_1 + w\_2 * c\_2 + \dots$$

where c_i=0 i_f fi=t_i and c_i=1 if f_i!=t_i (eq. 2) The operator !=represents strict inequality.

The number (N) may be used in this manner for representing a magnitude of a delta difference between the distinctiveness rating, value for the notifications 216 of the associated state transition.

The color coding or other visual representation, such as shading, included as part of the distinctiveness ratings may be calculating for representing a color magnitude of the delta difference for the distinctiveness rating associated therewith. The illustrated color coding is shown to be confined relative to a color coding map 258, whereby the color coding map 258 translates the number to a visual indicator 222, which for exemplary purposes shown to correspond with darker colors representing less distinctiveness and brighter colors representing greater distinctiveness.

The feasibility callout may be a visual representation included as part of each of the distinctiveness ratings shown for non-limiting purposes to correspond with a box-shaped callout being presented or omitted from the related cell. The feasibility callout may be based on a determination made as to whether the corresponding state transition is determined to be one of feasible and infeasible. FIG. 4 illustrates a plurality of solidly colored cells devoid of a distinctiveness rating due to the corresponding cells aligning with state transitions whereby the notifications 216 associated therewith may be incapable of being reached or used. A state transition from state A back to the same state A may be infeasible and/or irrelevant for notification 216 purposes since the corresponding notifications 216 would be the same. The state transitions in FIG. 4 may be included within the distinctiveness abstraction table 250 for purposes of theoretical possibility and/or to meet FSM principles for generating a truth table or other tabulations of each notification 216. It may, however, be impossible, impractical, or otherwise infeasible for the modeled system to undertake the corresponding state transition or to undertake the corresponding state transition while operating within normal operating boundaries or capabilities. The feasibility callout may be used in this manner to indicate the state transitions, thereby the corresponding distinctiveness ratings, associated with state transition team to be feasible. Another approach to account for the state transition feasibility may be based on the color being omitted or removed for those state transitions determined to be infeasible.

The distinctiveness abstraction table 250 is believed to be beneficial in providing an output that the host computer 12 or other device operable in according with the present disclosure may generate from processing of the state transition table 60 and the feedback table 214. The host computer 12 and/or another entity operable with the modeled system may include corresponding non-transitory instructions stored on a computer-readable storage medium, which when executed by one or more processors, may be sufficient to facilitate generating and/or presenting the distinctiveness ratings in the manner described herein, i.e., through the distinctiveness abstraction table 250 in a manner that may be visually interfaced with an individual and/or in another manner that may generate an equivalent file or data construct capable of being provided to another computer or logically programmed entity. The distinctiveness tool 210, accordingly, is believed to be a substantial, technological, and functional improvement capable of realizing the underlying computation processes and logical procedures described herein in a manner that an individual operator themself may be unable to replicate and in a manner that renders and transforms the underlying information into a significantly more helpful and beneficial form.

Figure 5:
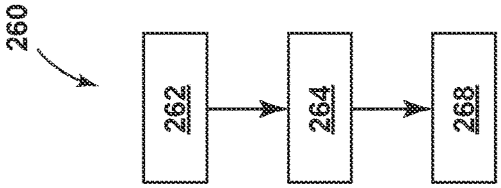
FIG. 5 illustrates a flowchart of a method for characterizing the notification distinctiveness in accordance with one non-limiting aspect of the present disclosure.

FIG. 5 illustrates a flowchart 260 of a method for characterizing the notification 216 distinctiveness in accordance with one non-limiting aspect of the present disclosure. The method may be utilized to facilitate characterizing notification 216 distinctiveness for an FSM modeled system or other system whereby it may be desirable to provide users, machines, computers, etc. notifications 216 as feedback when system transitioning from one state to another, i.e., upon reaching a newly, transitioned-to state. Block 262 relates to an analysis process whereby a tabulating module or other feature of the host computer 12 may be configured for determining a state transition table 60 for the FSM modeled system. The state transition table 60 may correspond with that illustrated above in FIG. 2 whereby a plurality of state transition between a plurality of states 63 may be identified, with each state transition event defining a rule for transitioning from a transitioned-from one of the states to another transitioned-to one of the states. Block 264 relates to a distinctiveness or other feature the host computer 12 may be configured for generating a distinctiveness in this rating for each of the state transitions based on comparatively quantify relative distinctiveness with between the notifications 216 for the transition-prompt and transitioned-to state associated therewith. The distinctiveness ratings may be generated in a manner described above with respect by arranging the distinctiveness ratings within a distinctiveness abstraction table 250 for visual inspection and/or by distributing the distinctiveness ratings in another form, e.g., table, electronic data set, etc. Block 268 relates to a distinctiveness analysis process whereby the distinctiveness tool 210 and/or another feature of the host computer may be configured for processing the distinctiveness abstraction table 250 other distinctiveness output from Block 264. The distinctiveness analysis process, for example, may include the host computer out of the distributors to automatically identifying or otherwise drawing attention to distinctiveness ratings below a desired threshold, such as a threshold selected according to design parameters.

As supported above, the distinctiveness tool 210 and other features of the present disclosure may be useful in improving identification of HMI perceptible, noticeable, visible, and/or cognitively clear issues of state transitions in a formal manner (verification), automatic highlighting of topics for focused empirical validation, increasing the speed and accuracy of HMI design process, and/or automating verification of notifications for state transitions. The system, for example, may be useful with advanced automated systems consisting of multiple modes, and system states within modes, each referring to a different control behavior and responsibility of the system whereby transitions between system modes and states may be apparent to the user to promote correct understanding and appropriate use behavior. The present disclosure proposes a state transition visibility tool (STVT) or other tool configured for multiple modalities to identify HMI notification issues. The verification can be done manually by visual inspection, or automatically by a computerized system, such as based on a description of the system modes, as a state transition table with a set of visual characteristics, whereafter a systematic assessment of HMI notifications according to a set of rules may be generated. Modern automated systems may be extremely complex as such systems may include various modes and transition rules, some of which are executed automatically while others are based on various timers with hidden logic.

The present disclosure contemplates a tool for providing clear user feedback, when the state transition is the result of a direct user action, but nevertheless a reasonably perceptible, noticeable, visible, and/or cognitively clear state transition may be essential when the transition is automatic, which may be triggered by the system following a certain rule, associated with inner system events, external events which are not initiated by the user, or a timeout event. In the absence of notifications for state transition, there may be a potential for confusion in perceiving the accurate mode. Such inaccuracies or inconsistencies of interaction may compromise the case of learning/understanding of the systems. The elements described herein may provide a set of properties that serves to quantify the notifications of the state transitions such that, using this approach, it may also be possible to identify potential for improvements and develop designs that are more user friendly in future HMI systems. At least in this manner, one non-limiting aspect of the present disclosure relates to verifying a notifications for state transitions in critical, or other, complex finite-state machine (FSM) type systems, automatically verifying the design correctness according to evaluations of notifications for state transitions, e.g. visual, auditory, haptic, and/or multimodal that serve to highlight potential user confusion, mode errors, and learnability difficulties, which may be particularly advantageous when cognitive clarity may be challengeable to achieve without a sufficient distinction between different states and/or when identification of design errors prior to the implementation of the system may be desirable.

In the event the distinctiveness tool determines a poor or less than desirable discriminability following a state transition, a flag or low additive score or rating may be provided. For example, when a negative feedback, such as in the event a telltale disappearance, is used as a sole indication for state transition, a flag or a low score should be given. Following an automated inspection, flags may be provided in case the discriminability between different states following a state transition is low, or in other words when a high visual similarity between two different states may occur. The present disclosure may advantageously rate differences in terms of shape, size, color, pulsations, pattern, location, optionally along with the additional characteristics mentioned above for other modalities, e.g. the rating may be affected by the size of each component and its viewing angle, such as when a steering wheel lightbar has a 10 times larger weight than a telltale due to its size, saliency, and proximity to the normal line of sight. Following this strategy, changing a telltale's color while keeping the steering wheel color constant following the transition may be insufficient (e.g., in the transition from one state to another, the change may be very subtle, while the prominent steering wheel lightbar remains green). The distinctiveness tool may be beneficial in this regard to identify the lack of differentiation and to draw attention to the need for its correction.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All values of parameters (e.g., of quantities or conditions), unless otherwise indicated expressly or clearly in view of the context, including the appended claims, are to be understood as being modified in all instances by the term "about" whether or not "about" actually appears before the value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for characterizing notification distinctiveness of a finite-state machine (FSM) modeled system, comprising:
identifying, via a host computer, a plurality of states for the FSM modeled system;
identifying, via the host computer, a notification to be presented for each of the states, the notifications each presenting one or more indicators selected from a collection of indicators, the collection of indicators including at least one visual, auditory, and haptic attribute;
identifying, via the host computer, a plurality of state transitions between the states, the state transitions each defining an event for transitioning from a transitioned-from one of the states to another transitioned-to one of the states;
generating, via the host computer, a distinctiveness rating for each of the state transitions, the distinctiveness ratings each comparatively quantifying relative distinctiveness between the notifications for the transitioned-from and transitioned-to states of the state transition associated therewith; and
communicating, via the host computer, an alert signal to a display screen or to an external device based on the generated distinctiveness rating.

2. The method according to claim 1, further comprising: generating the distinctiveness ratings based at least in part on the attributes for the notifications of the transitioned-from and transitioned-to states associated therewith.

3. The method according to claim 2, further comprising: assigning a value to each of the attributes; and
generating the distinctiveness ratings as a function of the values for the notifications of the transitioned-from and transitioned-to states associated therewith.

4. The method according to claim 3, further comprising: generating the distinctiveness ratings to be proportional to a delta difference between the values of the notifications for the transitioned-from and transitioned-to states associated therewith.

5. The method according to claim 4, further comprising: including a number as part of each of the distinctiveness ratings, the number representing a magnitude of the delta difference for the distinctiveness rating associated therewith.

6. The method according to claim 5, further comprising: including a color coding as part of each of the distinctiveness ratings, the color coding representing a color magnitude of the delta difference for the distinctiveness rating associated therewith.

7. The method according to claim 6, further comprising: presenting the distinctiveness ratings within a distinctiveness abstraction table, the distinctiveness abstraction table cross-referencing a plurality of cells relative to a plurality of columns and rows, each column and row being associated with one of the states, each of the cells representing the state transition of the cell and the row cross-referenced therewith.

8. The method according to claim 7, further comprising: determining each of the state transitions to be one of feasible and infeasible; and
including a feasibility callout for each of the distinctiveness ratings of the state transitions deemed to be feasible and omitting the feasibility callout for each of the distinctiveness ratings of the state transitions deemed to be infeasible.

9. A method for characterizing notification distinctiveness of a finite-state machine (FSM) modeled system, comprising:
based on a plurality of state transitions between a plurality of states of the FSM modeled system, identifying, via a host computer:
an event for transitioning from a transitioned-from one of the states to another transitioned-to one of the states; and
a transitioned-to notification to be presented upon attainment of each of the transitioned-to states; and
generating, via the host computer, a distinctiveness rating for each of the transitioned-to notifications, the distinctiveness ratings each quantifying distinctiveness of the transitioned-to notification for the transitioned-to state associated therewith; and
communicating, via the host computer, an alert signal to a display screen or to an external device based on the generated distinctiveness rating.

10. The method according to claim 9, further comprising: generating the distinctiveness ratings to quantify the distinctiveness of the transitioned-to notification relative to a transitioned-from notification of the transitioned-from state of the state transition associated therewith.

11. The method according to claim 10, further comprising:
the transitioned-to and transitioned-from notifications each presenting one or more indicators selected from a collection of indicators, the collection of indicators including at least one visual, auditory, and haptic attribute; and
generating the distinctiveness ratings based at least in part on differences between the attributes for the transitioned-to and transitioned-from notifications associated therewith.

12. The method according to claim 11, further comprising:
assigning a value to each of the attributes; and
generating the distinctiveness ratings as a function of differences between the values for the transitioned-to and transitioned-from notifications associated therewith.

13. The method according to claim 12, further comprising:
generating the distinctiveness ratings to be proportional to a delta difference between the values for the transitioned-to and transitioned-from notifications associated therewith.

14. The method according to claim 13 further comprising: including a number as part of each of the distinctiveness ratings, the number representing a magnitude of the delta difference for the distinctiveness rating associated therewith.

15. The method according to claim 14, further comprising:
including a color coding as part of each of the distinctiveness ratings, the color coding representing a color magnitude of the delta difference for the distinctiveness rating associated therewith.

16. The method according to claim 15, further comprising:

presenting the distinctiveness ratings within a distinctiveness abstraction table, the distinctiveness abstraction table cross-referencing a plurality of cells relative to a plurality of columns and rows, each column and row being associated with one of the states, each of the cells representing the state transition of the cell and the row cross-referenced therewith.

17. The method according to claim 16, further comprising:

determining each of the state transitions to be one of feasible and infeasible; and including a feasibility callout for each of the distinctiveness ratings of the state transitions deemed to be feasible and omitting the feasibility callout for each of the distinctiveness ratings of the state transitions deemed to be infeasible.

18. A system for characterizing notification distinctiveness of a finite-state machine (FSM) modeled system, comprising:

a module configured for determining a distinctiveness abstraction table for the finite-state machine, the distinctiveness abstraction table defining a plurality of state transitions between a plurality of states, each state transition defining an event for transitioning from a transitioned-from one of the states to another transitioned-to one of the states; and a distinctiveness tool configured for determining, via a host computer, a notification to be presented for each of the states;

generating, via the host computer, a distinctiveness rating for each of the state transitions, the distinctiveness ratings each comparatively quantifying relative distinctiveness between the notifications for the transitioned-from and transitioned-to states of the state transition associated therewith; and communicating, via the host computer, an alert signal to a display screen or to an external device based on the generated distinctiveness rating.

19. The system according to claim 18, wherein:

the distinctiveness tool is configured for determining one or more attributes for each of the notifications and generating the distinctiveness ratings based at least in part on differences between the attributes for the notifications of the transitioned-from and transitioned-to states associated therewith.

20. The system according to claim 19, wherein:

the distinctiveness tool is configured for presenting the distinctiveness ratings within a distinctiveness abstraction table, the distinctiveness abstraction table cross-referencing a plurality of cells relative to a plurality of columns and rows, each column and row being associated with one of the states, each of the cells representing the state transition of the cell and the row cross-referenced therewith.

* * * * *